C. STEINBACH.
Harness-Saddle.
No. 225,242. Patented Mar. 9, 1880.
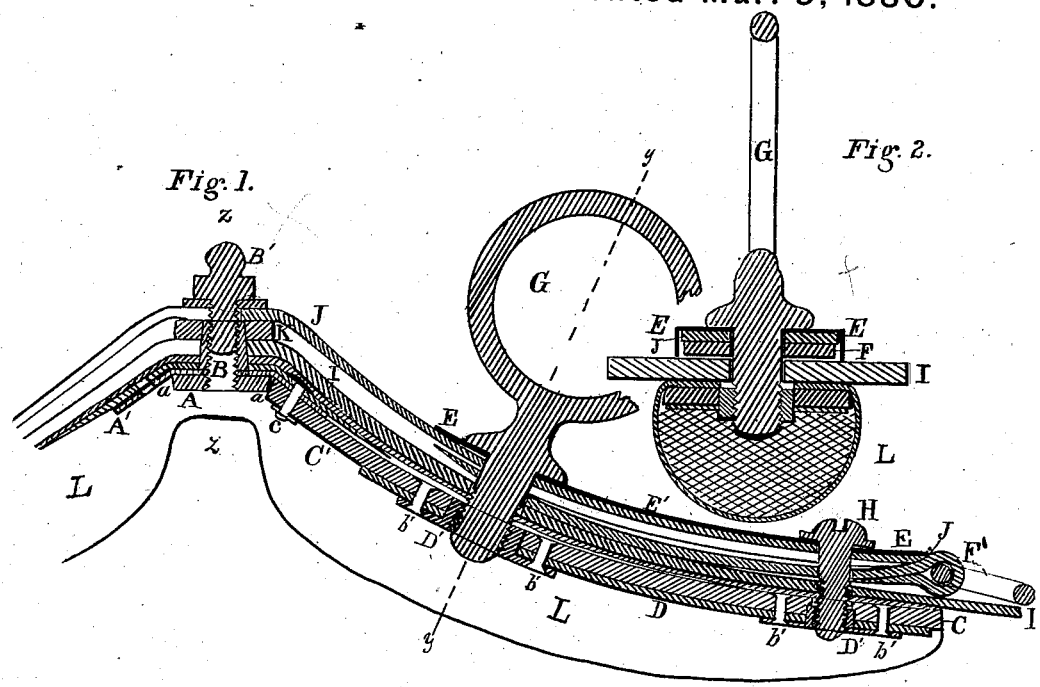
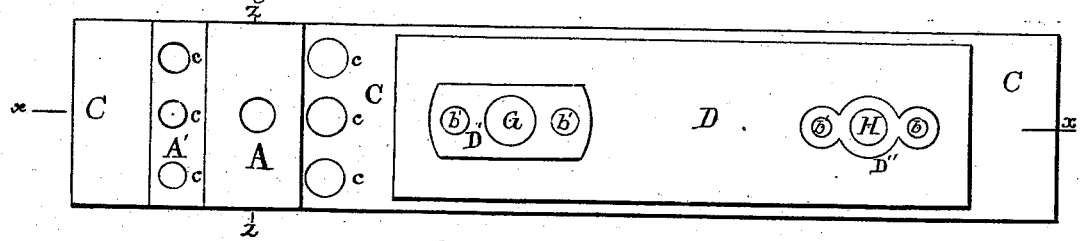
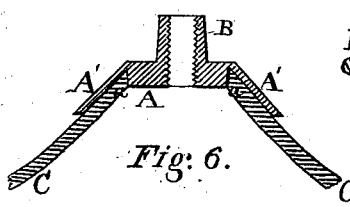
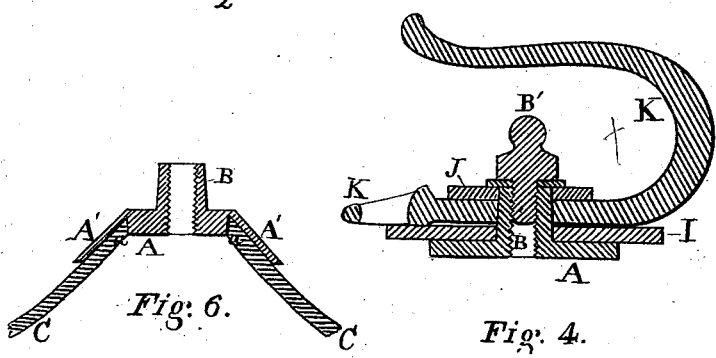
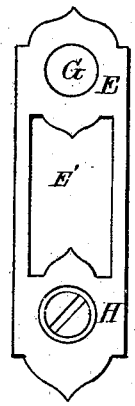
Witnesses
Inventor
Charles Steinbach
By E. G. Bennett
Atty

UNITED STATES PATENT OFFICE.

CHARLES STEINBACH, OF CHELSEA, MICHIGAN.

HARNESS-SADDLE.

SPECIFICATION forming part of Letters Patent No. 225,242, dated March 9, 1880.

Application filed November 4, 1879.

*To all whom it may concern:*

Be it known that I, CHARLES STEINBACH, of Chelsea, in the county of Washtenaw and State of Michigan, have invented certain new and useful Improvements in Harness Pads or Saddles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the construction of harness-saddles, whereby the tree or yoke is formed with wings, to which are attached the leather flaps; and also in the arrangement of metallic plates with the flaps, whereby greater flexibility in the skirts is obtained, all of which will be hereinafter more fully described.

Figure 1 is a longitudinal vertical section of one-half of the saddle on the middle line on $x\ x$ of Fig. 3. Fig. 2 is a section on line $y\ y$ of Fig. 1. Fig. 3 is an under-side view of Fig. 1, with the pad removed. Fig. 4 is a section of the tree at $z\ z$, Figs. 1 and 3. Fig. 5 is a top view of the covering-plate E. Fig. 6 is a section of the tree.

A is a metallic plate, with a projecting boss, B, having a screw-thread cut within it, forming a nut for the reception of a screw-pin, B'. In Fig. 1 the plate A is covered with a thin sheet of metal, which forms projecting wings A', having rivet-holes $c\ c\ c$, by which the leather flaps C C are fastened to tree A. This tree A, with the wings, is to be of one solid piece of metal, as shown in Fig. 6.

The plate A has shoulders $a\ a$ on each side under the wings, against which the square end of the flaps C abut and form a smooth surface under the tree, as in Fig. 6. The holes in the leather, being in the full thickness of it, make a stronger hold for the rivets.

C C are leather flaps fastened by rivets to the wings of the tree A. D represents metal plates curved to the proper shape for the saddle.

D' D'' are small plates, having nuts projecting from one side, which pass into holes in flaps C C. These plates are fastened to the flaps by rivets $b'\ b'$, and the line-wings $a$ and screws H screw into the plates D' D''.

The plates D are placed at convenient distances from the tree A, so as to form at C' a hinge for the pad, to be readily adjusted to the back of the animal. E is a metallic plate, turned down at the edges, as seen in section, Fig. 2, deep enough to contain the thicknesses of the several straps and protect them. At the same time they can be made very ornamental and add to the finish of the saddle, as seen in Fig. 5, where, in a panel formed at E', a piece of colored enameled leather can be inserted.

F is a strap of leather or of sheet metal, in which is the ring F' for the girth-strap. G is the ring for the driving-lines. I is a wide strap of leather covering the pad. J is a narrow finishing-strap. These two pass entirely over the saddle, having suitable holes at the tree for the boss B and pin B' to pass through.

K is the check-line hook, which has at its lower end a rectangular orifice corresponding with the section of the boss B of the tree A. The length of the boss corresponds with the thickness of the several straps and hook K, so that the pin B' will fasten them all snugly down upon the tree, as seen in section, Fig. 4. L is the pad forming the covering of the plate D and under side of the saddle.

Having thus described my invention, what I claim, and desire to secure by Letters Patent, is—

1. The combination of the plate D D and flaps C C, the shouldered tree A and rivets $c\ c\ c$, substantially as and for the purpose described.

2. The flanged covering-plate E, having a recess formed within it for the insertion of colored enameled leather or other material, in combination with the flaps of a harness-saddle, substantially as and for the purpose described.

In testimony that I claim the foregoing I have hereunto set my hand this 3d day of September, 1879.

CHARLES STEINBACH.

Witnesses:
 J. A. PALMER,
 L. TICHENOR.